United States Patent [19]
Brown et al.

[11] 3,800,286
[45] Mar. 26, 1974

[54] ADDRESS DEVELOPMENT TECHNIQUE UTILIZING A CONTENT ADDRESSABLE MEMORY

[75] Inventors: James L. Brown, Chelmsford; Richard P. Wilder, Jr., North Billerica, both of Mass.

[73] Assignee: Honeywell Information Systems Inc., Waltham, Mass.

[22] Filed: Aug. 24, 1972

[21] Appl. No.: 283,617

[52] U.S. Cl. .................................... 340/172.5
[51] Int. Cl. ..................... G11c 15/00, G06f 1/00
[58] Field of Search .................. 340/172.5, 173 AM

[56] References Cited

UNITED STATES PATENTS

| | | | |
|---|---|---|---|
| 3,387,272 | 6/1968 | Evans et al. | 340/172.5 |
| 3,508,220 | 4/1970 | Stampler | 340/174 |
| 3,585,605 | 6/1971 | Gardner et al. | 340/172.5 |
| 3,614,746 | 10/1971 | Klinkhamer | 340/172.5 |
| 3,662,348 | 5/1972 | Weiss | 340/172.5 |
| 3,676,857 | 7/1972 | Jackson | 340/172.5 |
| 3,681,762 | 8/1972 | Minshull | 340/172.5 |
| 3,685,020 | 8/1972 | Meade | 340/172.5 |
| 3,699,533 | 10/1972 | Hunter | 340/172.5 |
| 3,701,984 | 10/1972 | Burns | 340/173 R |

*Primary Examiner*—Paul J. Henon
*Assistant Examiner*—James D. Thomas
*Attorney, Agent, or Firm*—John M. Gunther; Ronald T. Reiling

[57] ABSTRACT

A content addressable memory is disclosed which provides for fast address development in a relatively addressed data processing system. The content addressable memory includes an associative memory, an encoder and a buffer memory. If the address provided to the associative memory had been previously stored in the associative memory, a signal is generated to the encoder which enables the actual address to be read from the buffer memory. If the address is not contained in the associative memory, actual address development through main memory is made. Additional features included in the content addressable memory are a replacement logic for indicating the next replaceable location in the associative memory and selection logic for determining the locations in the associative memory to be accessed.

12 Claims, 3 Drawing Figures

PATENTED MAR 26 1974

3,800,286

SHEET 1 OF 2

ADDRESS DEVELOPMENT TECHNIQUE UTILIZING A CONTENT ADDRESSABLE MEMORY

BACKGROUND OF THE INVENTION

1. Field of the Invention

This invention relates generally to data processing systems and more particularly to address development techniques utilizing content addressable memories.

2. Description of the Prior Art

To alleviate the ever increasing requirements of greater storage capacity in the main memory, the technique of virtual memory was developed for multiprogrammed data processing systems. Virtual memory is a concept which renders the memory capacity virtually limitless by storing the least used memory contents on a mass storage device such as a drum or disk file. When information contained on the mass storage device is needed by the program in execution, the desired contents are brought into main memory. As is apparent by using virtual memory, the address locations of the contents of information stored in main memory are constantly being changed. Hence, means must be provided to determine the present actual address of the information. With relative addressing, a means of ascertaining the locations of the changed contents of main memory is provided. Relative addressing references the address of the instruction to an origin such that the exact present location may be determined. The utilization of relative addressing, however, has a concommitant demand that means be provided to transform each relative address to an actual address so that the proper word is accessed. In a large capacity memory, several steps are required to develop the relative address into an actual address. Each step involves the referencing of a code via tables held in main memory. These codes when combined with predetermined portions of the relative address provide the actual address. Obviously, valuable computer time is wasted by developing the absolute address via the plurality of tables.

Relative addressing is only a partial solution for the dynamic allocation of memory space. Because of the random size of programs, the prior art uses a system which allocates memory in variable size segments and has facilities to restructure the memory allocation within the course of a program run. This system, called segmentation, allows each process to access its own or related memory segments via a scheme using segment numbers and segment descriptors. A segment number directs access to a specific segment located in memory while segment descriptors contain the actual starting address and size of memory segments. Both segment numbers and segment descriptors are contained in main memory and maintained by the operating system. The utilization of segmentation in a relative address environment further increases the complexity of determining the actual address.

To provide speed in an address environment, content addressable memories have been used in address development. All words contained in a content addressable memory are simultaneously interrogated for identity with a key word. Thus, addressing by address location is non-existent for a content addressable memory. If no locating signal is produced with a search in a content addressable memory, the key word is not contained in this memory and must be transferred to main memory for development in normal fashion. The exploitation of content addressable memories has been limited because of their high cost. Moreover, when content addressable memories are utilized in the environment of segmentation and relative addressing their cost has become prohibitive since additional circuitry is needed for developing the actual address.

OBJECTS OF THE INVENTION

It is an object of this invention to provide an apparatus which provides for fast address development while using a minimum of components and hence is low in cost.

It is a principal object of this invention to provide an improved apparatus using a content addressable memory for developing an actual address from a relative address which is supplied during execution of a program.

It is a further object of the invention to provide an improved apparatus for use in address development which apparatus automatically locates the most recently used segments.

SUMMARY OF THE INVENTION

The foregoing objects are achieved according to one embodiment of the instant invention and according to one mode of operation thereof by providing a content addressable memory in a shared access data processing system wherein a relative address (instant address) is supplied by a data processor during execution of a program by the system. The contents of an associative memory storing a plurality of recently used addresses is compared with the instant address. A signal is generated which is indicative of whether or not the instant address is contained within the associative memory. Match lines are disclosed which are responsive to an indication of the instant address being contained in the associative memory, said match lines enabling an encoder to read out of a buffer memory the actual address corresponding to the instant or relative address. If a signal indicating a no match condition has occurred, a main memory is addressed. Replacement logic and selection logic are also provided which transfer the address not located within the associative memory into the next available location of the associative memory.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

DETAILED DESCRIPTION OF THE INVENTION

Figure 1:
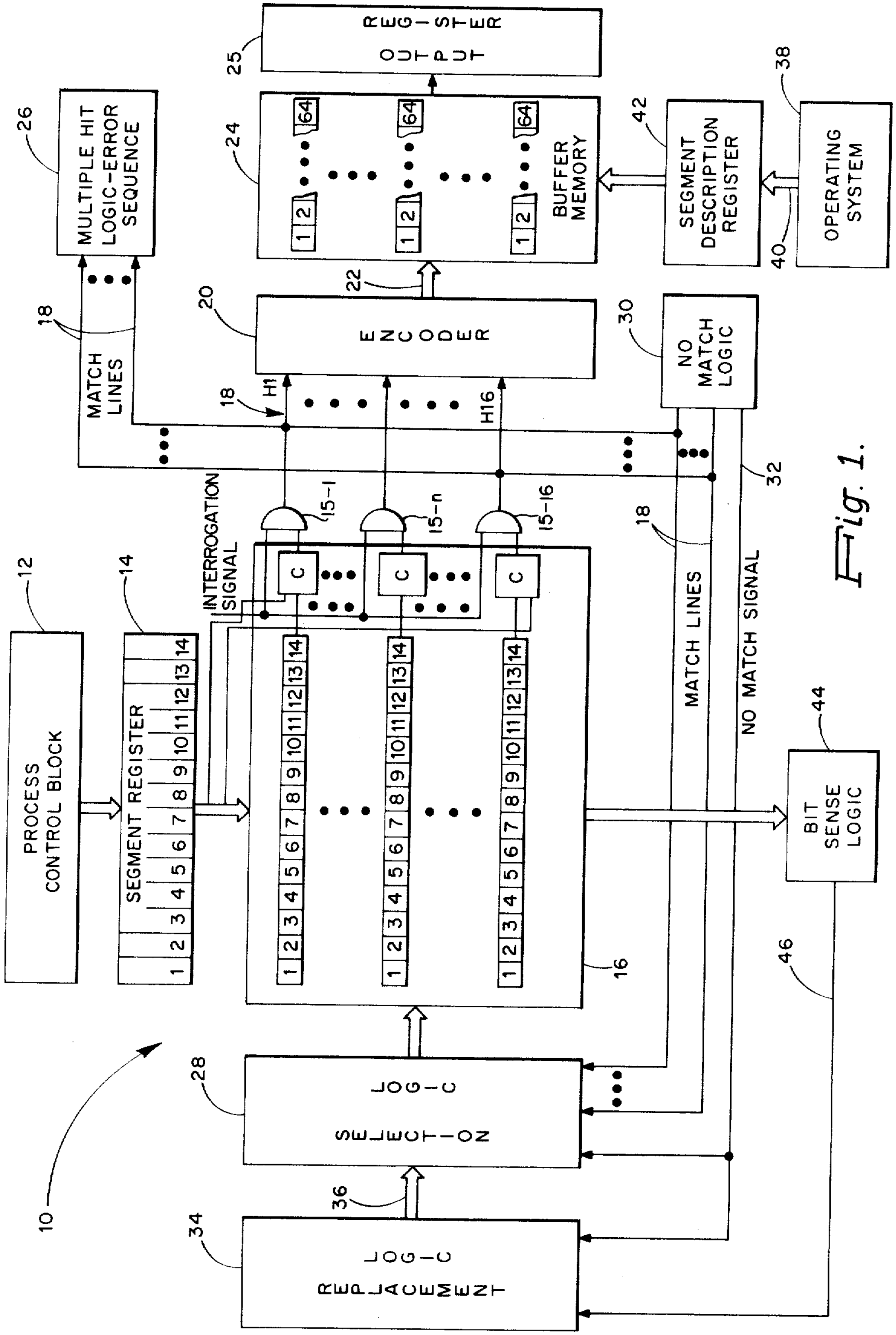
FIG. 1 is a block diagram illustrating the overall organization of the invention.

The preferred embodiment of this invention as shown in FIG. 1 forms a part of a large size data processing system capable of extremely rapid operation. The preferred embodiment is operative when the central processing unit (CPU) (not shown) generates an instruction. An instruction is a word which directs a discrete step in the data processing operation and should be distinguished from a data word on which logical or arithmetic operations are performed. An instruction word usually includes a command and address portion. The command portion represents the nature of the step to be executed. In the instant embodiment the command portion would indicate, for example, that a word located in main memory is to be accessed. The address portion represents a memory word location in one of a plurality of interleaved main storage memories from which a data word is to be retrieved for processing or in which a processed data word is to be stored. In the instant embodiment the address portion does not identify an actual memory word location but rather it only represents the location of an actual memory word location in one of the main memories relative to a reference location. Accordingly, the address supplied by an instruction word is termed a "relative" address. A relative address is transformed to an actual address of a particular cell in a particular one of main memories by a series of successive steps which derive or translate the relative address into an actual address of one of the pluralities of main memory. The combination of these successive steps for obtaining an actual address location is called address development.

Referring to FIG. 1, when an instruction is generated by the CPU (not shown) both the command and address portions are analyzed. If the command portion indicates that main memory is to be accessed, a microprogram interprets this instruction as containing the content addressable memory (CAM) operating code. The address portion is provided to a process control block (PCB) 12 which provides a segment number and a displacement. There are several PCBs 12 associated with this system but for purposes of explanation only one is described.

PCB 12 stores all necessary control information required for processing a program. However, for the purpose of this preferred embodiment, PCB 12 is limited to providing a segment number and a displacement. A segment number directs access to a specific segment in one of the main memories. In the preferred embodiment, the CPU may have over 2,000 unique segments, each segment being variable in size. The segment number, which, for example, may be twelve bits, identifies one segment. Because of the dynamic allocation of the segments located in the plurality of main memories, it is not known where the identified segment is presently located. In order to provide this information, a segment descriptor is maintained by the CPU's operating system. A segment descriptor furnishes the actual base address of each unique segment. Moreover, each segment is described by a different segment descriptor. When a segment is moved around in the plurality of memories by the operating system, the information contained in the segment descriptor changes accordingly. The displacement provided by PCB 12 directs access to a specific location within the segment. After the segment has been determined and the current starting address of the segment identified, the displacement indicates the actual location of word that was requested.

The segment number develops the segment descriptor by successively accessing several tables also maintained by the operating system. However, for purposes of this invention no description of these tables is required since this embodiment obviates the need for referencing these tables.

PCB 12 transfers the segment number into a temporary storage register 14 hereinafter referred to as a segment register. Segment register 14 may have sixteen bit locations but for purposes of this disclosure only fourteen bit locations are discussed. Of the fourteen locations which are contained in the segment register 14, either the first six or twelve locations may be important for development of the segment description. This determination is made by the first bit in the segment register 14. This bit shows whether a large segment is to be accessed, i.e., the bit is a binary ZERO, in which case only the first six bits are needed or whether a small segment is to be accessed, i.e., the bit is a binary ONE, in which case the first twelve bits are needed. This results since there are more small segments than large segments. In order to properly describe the small segments, more bits are required. If only the first six bits are needed, the last ordered six bits are disabled. Segment register 14 controls the addressing of an associative memory 16. An example of a segment register 14 is shown in TTL Integrated Circuit Catalog of Texas Instruments, dated Aug. 1, 1969, published by Texas Instruments, Inc., and having Catalog No. CC 201-R. The circuit type, for example, may be SN5475 as shown on page 6-1 thereof.

Segment register 14 is coupled to an associative memory 16. Associative memory 16 has circuitry which includes associative memory cells, bit sense amplifiers and drivers, and word sense amplifiers and drivers. In the preferred embodiment, memory 16 contains sixteen words, each word having sixteen bits. The memory 16 may be, for example, made of a plurality of Fairchild 93402 content addressable memory (CAM) chips. This chip is shown in Fairchild Semiconductor TTL Data Book, dated June, 1972, page 9-6, published by Fairchild Semiconductor and having a publication No. 01-10-0241-081/50m. As is well known these memory chips contain logic for disabling and comparing along with appropriate gating and provide for several operations to be performed on its contents. A word or any part of a word contained in memory 16 may be read, compared with another word with a match or no match signal generated thereby, or written either in whole or in a selected part. All these typical operations are utilized in the instant invention.

Associative memory 16 is coupled to match line 18 via gates 15, which may be AND gates. Each gate 15 has its other input coupled to an interrogate signal which is generated by the CPU. When an interrogate signal is presented to gates 15, the consequence of the comparison between the contents of segment register 14 and associative memory 16 are provided. If one word in associative memory 16 contains a match to the contents of segment register 14, then a signal by comparator 13 is provided over one of match lines 18 is generated from this word.

The match signal is provided to an encoder 20. The function of encoder 20 is to transform the signal on one of the sixteen match lines to a four bit address. Encoder 20 provides this four bit address over lines 22 to a buffer memory 24 so that the information contained in a particular location of buffer memory 24 is selected. Buffer memory 24 is for purposes of illustration a 16 word by 64 bit memory. Memory 24 may include, for example, inexpensive solid state memory chips which are internally configured to store the sixteen words. The word in buffer memory 24 designates the actual starting address location of the segment for the relatively addressed word and is known as a segment descriptor. Each of the words in memory 24 has a one to one correspondence with the words in associative memory 16. When a location in buffer memory 24 is selected, the word it contains is read into an output register 25 where it is utilized as is well known in the art.

When a segment number in segment register 14 is matched to a word in memory 16, the segment descriptor in memory 24 corresponding to the segment number is provided. Since each segment number directs access to one specific segment in one of the plurality of main memories and since each segment descriptor identifies the current actual starting address of the segment, the identification of the segment is known. The displacement provided by the PCB 12 then identifies the specific address location within the segment. Thus the instant invention provides the necessary information for developing a relative address in an extremely short period of time. If normal address development was required, the segment number would have to reference successive tables controlled by the operating system. These tables, which are continuously updated by the operating system, develop the segment descriptor. By the instant invention this updating procedure is negated.

A signal over match lines 18 is also provided to selection logic 28. Selection logic 28, which is illustrated in detail in FIG. 3, identifies, as shall be hereinafter described, the segment number location in memory 16 where the match condition occurred.

If an error situation results and several segment numbers contained in memory 16 are signalled to have the interrogated information of segment register 14, i.e., if several match signals are provided, multiple hit logic 26 is enabled. Multiple hit logic 26 automatically engages an error sequence such that all information contained within the locations of the associative memory 16 are erased by means not shown. Thus no multiple matched signals should reoccur. Multiple hit logic 26 may be any selection logic which is enabled by two or more simultaneous signals.

If none of the match lines 18 are conductive, the no match logic 30 is enabled and a signal is provided over line 32. No match logic 30, which may be a NOR gate, enables several operations to occur.

Figure 2:
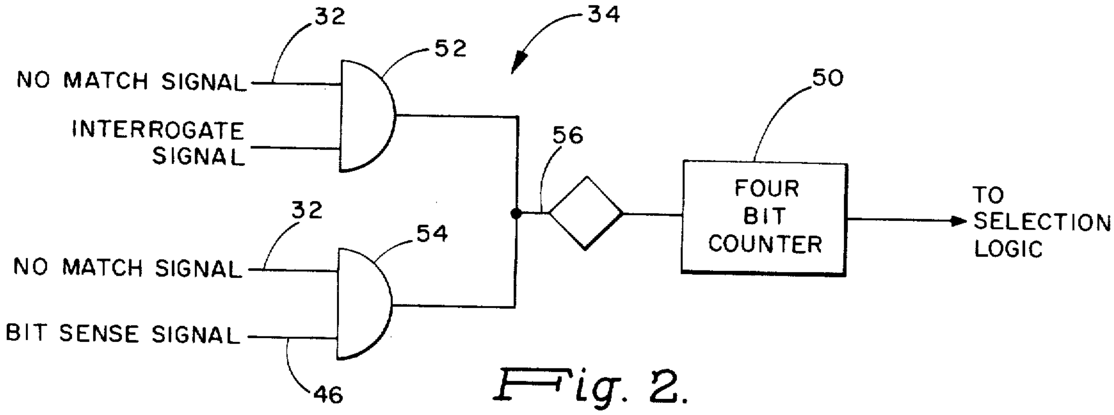
FIG. 2 is a schematic diagram illustrating the replacement logic shown in block form in FIG. 1; and, FIG. 3 is a schematic diagram of the selection logic shown in block form in FIG. 1.

Whenever a no match condition exists, replacement logic 34 is updated. The replacement logic, which is shown in greater detail in FIG. 2 is a four bit binary counter which indicates via its output 36 the next location in associative memory 16 to be accessed. Replacement logic 34 is based on the theory that the most recently used address has the highest probability that it will be accessed again. By pointing in a seriatim manner to the sixteen locations in associative memory 16, the replacement logic 34 ensures that the sixteen most recently used segment numbers can be rapidly utilized.

If a no match condition exists, address development via the normal time consuming process is made. Thus the relative address is translated until the actual memory location in one of the main memories is known. During this process, the operating system 38 provides the segment descriptor. This segment descriptor is delivered to a location in memory 24 pointed to by encoder 20. More specifically, operating system 38 provides a segment descriptor to segment descriptor register 42 via lines 40. Segment descriptor register 42 may be a temporary storage register. The segment descriptor contained in register 42 is then written into a location in memory 24 directed by the signals on encoder output lines 22. Since the address of encoder 20 is determined by associative memory 16 a correspondence between the segment number and segment descriptor is provided.

Segment register 14 in addition to the twelve bits of the segment number contains two other bits. One bit, referred to as a validity bit, is used to indicate a presently valid segment number in memory 16. This bit is automatically written under microprogram control for each segment number and, for purposes of explanation, it will be assumed that the validity bit is placed in the thirteenth location of the segment register 14. Before a comparison of segment register 14 and associate memory 16 is made, a binary ONE, representing a true condition, is written into the validity bit location of segment register 14. Unless the segment number being compared contains a binary ONE bit in the thirteenth location, no possible match can be provided. Hence, as will be subsequently disclosed, the validity bit ensures that only current information is accessed.

The second additional bit, hereinafter referred to as a procedure bit, is used to indicate a procedure segment number. When a program is running, the segment number having a procedure bit attached thereto designates the active procedure currently being used. At any given time there can be only one procedure bit in the associative memory 16. When a new procedure is introduced, the old procedure bit is purged by selection logic 28. The new segment number which designates the active procedure currently being used will have the procedure bit appended when stored in memory 16 by selection logic 28. For purposes of explanation, it will be assumed that the procedure bit is placed in the fourteenth location of segment register 14.

When a no match condition is present, a segment number in associative memory 16 is replaced. In the instant embodiment, the segment number scheduled to be replaced is the oldest resident one. Under some circumstances, however, this segment number may be the segment number of the active procedure currently being utilized. In order to prevent replacement of an active procedure segment number, bit sense logic 44 is provided. Bit sense logic 44 determines whether or not a procedure bit is appended to the segment number. If this condition exists, bit sense logic provides a signal over line 46 to the replacement logic 34. The replacement logic, in turn, enables the selection logic 28 to select another segment number in memory 16 for replacement. Thus the segment number having a procedure bit appended is new replaced.

FIG. 2 illustrates replacement logic 34. Replacement logic 34 comprises a four bit counter 50 and two AND gates 52, 54 connected to common line 56. The four bit counter 50, which may alternatively be a shift register, is incremented each time a signal is provided over line 56, i.e., each time gate 52 or gate 54 is enabled. Gate 52 is enabled when a no match signal 32 is generated from associative memory 16 via no match logic 30 and the interrogation signal provided to gates 15 is still present. Gate 54 is enabled when a no match signal 32 is generated from memory 16 via logic 30 and when bit sense logic 44 indicates that a procedure bit has been sensed in the segment number read from memory 16. By incrementing the counter 50 to point to the next location in memory 16, gate 54 ensures that the segment number having an active procedure bit is never replaced in associative memory 16.

Figure 3:
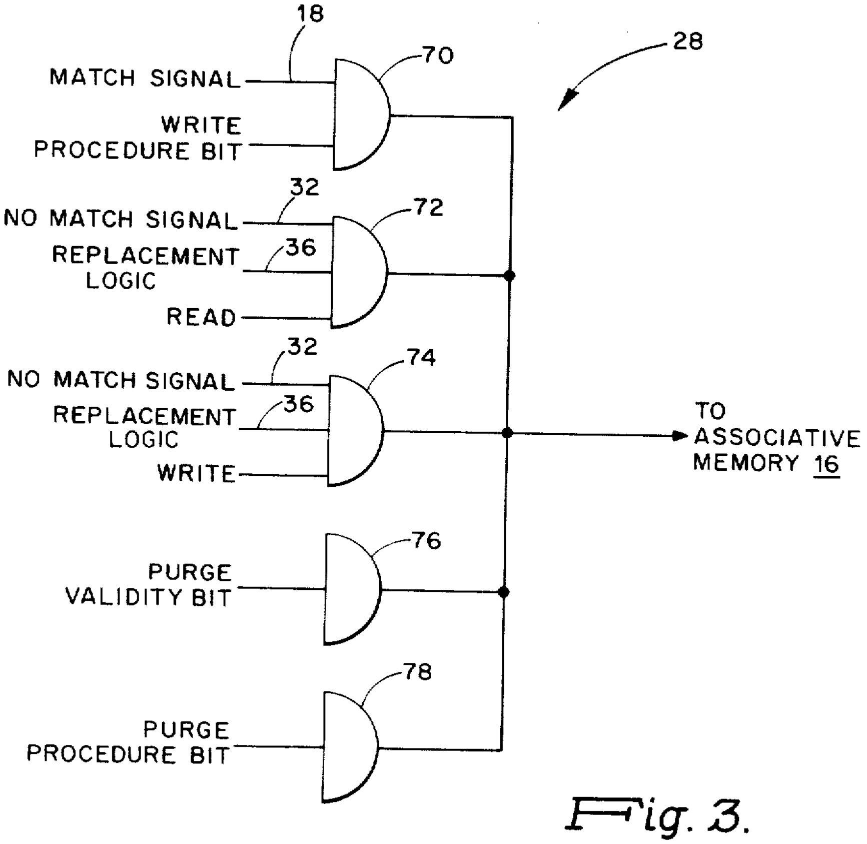

FIG. 3 illustrates a preferred embodiment of selection logic 28. Selection logic 28 comprises five gates 70, 72, 74, 76, 78, duplicated for each of the sixteen segment number locations in associative memory 16. When any one of the five gates is enabled, one or more locations of memory 16 are addressed via selection logic 28.

Gate 70 is enabled when a match signal is generated from associative memory 16, and when a microprogrammed input is provided because a procedure bit is to be written into memory 16. The function of gate 70 is to write a procedure bit, i.e., a binary ONE, into the fourteenth location, for the segment number designating the active procedure currently being used. The microprogram control automatically takes cognizance of all new procedures being entered.

Gate 72 is enabled by three conditions. First, a no match condition exists; second, a signal is generated on line 36 from the replacement logic 34; and third, a microprogrammed input for reading the contents of the selection logic is given. This situation occurs when it is necessary to determine whether or not the present location in memory 16 contains a procedure bit. The output from memory 16 is read into bit sense logic 44. If a procedure bit is sensed, then the replacement logic 34 is incremented a second time and the next address location is enabled.

Gate 74 is enabled when three conditions occur. These are: a no match signal generated from no match logic 30, a signal generated by replacement logic 34 via line 36, and a microprogrammed input which is enabled when the contnets of segment register 14 are to be written into memory 16. The function of gate 74 is to write the instant unmatched segment number contained in segment register 14 into the next following memory 16 location. This is done since the instant segment number is theoretically the most likely to occur in the immediate future.

Gates 76 and 78 have microoperation control leads. Gate 76 is enabled when a new PCB 12 is entered. A new PCB 12 may be entered when a new routine or subprogram is executed by the CPU. After a new PCB 12 is entered, s signal is sent to all sixteen gates 76 and the validity bit, i.e., bits in location 13, are all purged with a resultant binary ZERO. After the validity bits have been purged there cannot be a matched condition occurring since the validity bit is interrogated as part of each segment number.

Gate 78 is also enabled by a microoperation control lead. When a new procedure is introduced to the same PCB 12 or a new PCB 12 is entered, the lead receives a signal purging all procedure bits in bit location 14.

The operation of the CAM 10 is as follows. When a new PCB 12 is entered, the validity and procedure bit positions, i.e., bit positions 13 and 14 are purged by selection logic 28 via gates 76 and 78. A relative address is read from the CPU into PCB 12 which, in turn, provides a segment number. This segment number is then gated into segment register 14, and a validity bit is appended. A comparison is then made of the contents of segment register 14 and the contents of associative memory 16. This comparison determines whether the segment number in segment register 14 is contained in associative memory 16. For this initial entry there is a no match condition since the validity bits in memory 16 have been purged and contain a false condition. An interrogation siganl is provided to gate 15 to determine the results of the comparison. Since there is no agreement between segment register 14 and memory 16, no match logic 30 provides a signal over line 32. This no match signal is provided to replacement logic 34. This signal is current with the interrogation signal. Gate 52 is enabled and increments the replacement logic 34 to its next location. The signal from replacement logic 34 then enables the selection logic 28 via gate 72 which addresses a location in associative memory 16.

While address development is occurring, the location in memory 16 enabled by selection logic 28 is read into bit sense logic 44. It is then tested to determine whether the segment number read from memory 16 contains a procedure bit. Since the procedure bit has been purged for a new PCB 12 being entered, the bit store logic 44 does not sense a procedure bit and hence does not provide a signal to replacement logic 34.

After this condition has been determined, a write command is initiated by the microprogram control. More specifically gate 74 of selection logic 28 is enabled. The segment number in segment register 14 along with the validity bit is then written into a location in associative memory 16.

While the above operations are occurring, the segment descriptor defining the actual address is developed. This segment descriptor is stored in segment descriptor register 42.

Subsequently, memory 16 is reinterrogated by segment register 14 containing the same segment number. Under these conditions a match signal 18 is generated. The match signal enables encoder 20 which points to location in buffer memory 24 corresponding to the enabled matched line. The segment descriptor in register 42 is then written into this location of buffer memory 24. Since the microprogram knows that this particular segment number designates the active procedure currently being used, the matched signal also enables selection logic 28. More particularly, gate 70 is enabled and procedure bit is appended to the segment number stored in associative memory 16.

The next relative address delivered to PCB 12 is processed and a segment number is delivered to segment register 14. This segment number is probably not another active procedure since a procedure usually requires at least several actions to be completed. After the segment number has been loaded in segment register 14, a validity bit is added. A comparison of the contents of segment register 14 and associative memory 16 is made and an interrogate signal to gate 15 is provided. If the match lines 18 do not provide a signal, no match logic 30 is enabled. No match logic 30 provides a signal over line 32 to replacement logic 34. Gate 52 of replacement logic is enabled and the four bit counter 50 is incremented. Selection logic 28 receives a signal from replacement logic 34 via line 36. Since a no match condition exists, a read signal is provided by the microprogram and gate 72 is enabled. The stored segment number of memory 16 is then read into bit sense logic 44 where it is determined whether the segment number has an attached procedure bit. If it does not, then bit sense logic 44 is not enabled. If the bit sense logic ascertains that the segment number did have a procedure bit, then gate 54 of replacement algorithm 34 would be enabled. This increments counter 50 which in turn provides a signal via line 36. Subsequent to the read command, the microprogram provides a write command. With this signal gate 74 is enabled and the contents of segment register 14 are written into the location addressed by selection logic 28. No read command is needed since there can only be one procedure bit in associative memory 16. Since the previous location contained this signal, the next location could not possibly have one. Thus, the need for a second read command is obviated.

When a segment number in segment register 14 is contained in associative memory 16, a match signal over lines 18 is generated. The need to reference main memory in this situation is obviated thus providing a substantial savings of time. The match signal 18 enables encoder 20 which selects the location in buffer memory 24 to be accessed. The segment descriptor is thus read out of memory 24 into output register 25 and the actual address is known.

Where a new procedure is entered, the microprogram control enables gate 78 to purge all the procedure bit locations. Since there is only one procedure bit in memory 16, in reality only one bit location is being purged. However, it is much easier to purge all the locations than to determine which location contains the procedure bit. PCB 12 provides the segment number to segment register 14 and a validity bit but not a procedure bit is appended. A comparison of the contents of segment register 14 and associative memory 16 is made and a interrogation signal is then generated. If the contents are identical, one of the match lines 18 associated with the segment number in memory 16 provides a signal to encoder 20. The segment descriptor in buffer memory 24 is pointed to by line 22 and the segment descriptor having the actual address is read. Under this situation gate 70 of selection logic 26 is also enabled and a microprogram command to write a procedure bit in the matched line location is performed. Hence when the new procedure is entered, the match signal enables both encoder 20 and gate 70 so that the actual address is read into memory 24 and the procedure bit is attached to the segment number stored in memory 16 respectively. If there was a no match condition then no match logic 30 is enabled and a signal provided over line 32. The replacement logic 34 is enabled via gate 52 and points to the next consecutive location. Selection logic 28 receives the signal from replacement logic 34 via line 36. More specifically, gate 72 of selection logic 28 would be enabled. The segment number addressed by selection logic 28 would be read out into bit sense logic 44. No procedure bit is sensed since all have been purged, and bit sense logic 44 is not enabled. The write command is then enabled and the segment number is written into the location addressed by selection logic 28. During this time, the main memories have been searched and the operating system 38 has stored the segment descriptor in the segment descriptor register 42. On reinterrogation a match signal occurs. The encoder 20 enables the buffer memory 24 and the segment descriptor in registor 42 is written into the addressed location in memory 24. The match signal also enables selection logic 28. Since the microprogram knows that this is the active procedure to be used, gate 70 is enabled and a procedure bit is attached to the segment number stored in associative memory 16.

After sixteen no match conditions occur for the same procedure, the replacement logic 34 has returned to the location in memory 16 containing the segment number which is the active procedure. If another no match condition occurs, no match logic 30 provides a signal to replacement logic 34. The replacement logic is incremented by a signal from gate 52 and enables gate 72 of selection logic 28. The segment number in memory 16 is read into bit sense logic 44. Bit sense logic 44 determines that the segment number has a procedure bit attached and provides a signal to replacement logic 34 via line 46. Gate 54 is enabled incrementing counter 50 and a signal is provided over line 36. The next location of memory 16 is now addressed and the write command is enabled. As is apparent, the segment number designating the active procedure is not destroyed. The word in segment register 14 is then written into this location. On reinterrogation, a match signal is generated over line 18. This match signal enables encoder 20 so that the segment descriptor in register 42 is written into memory 24.

If two or more match lines 18 are enabled by the comparison of associative memory 16 with segment register 14, multiple hit logic 26 is enabled and an error sequence instituted. The error sequence purges all the locations in memory 16 while informing an operator of this condition. This sequence permits remedial steps to be taken. Alternatively, the multiple hit logic 26 may enable gate 76 of selection logic 28 thus purging all the validity bits and ensuring that the plurality of matched conditions does not reoccur.

While the principles of the invention have now been made clear in an illustrative embodiment, there will be immediately obvious to those skilled in the art many modifications in structure, arrangement and components used in the practice of the invention without departing from those principles. The appended claims are therefore intended to cover and embrance any such modifications, within the limits only of the true spirit and scope of the invention.

What is claimed is:

1. An apparatus for developing a relative address for a memory having variable sized segments, said apparatus comprising:
   - means for storing a plurality of first addresses, and second addresses
   - means for comparing a second address with said plurality of first addresses,
   - encoder means, responsive to said comparing means, for providing a third address when said second address is found matched to one of said plurality of first addresses, and
   - memory means for storing a plurality of fourth addresses, said memory means enabled by said third address from said encoder means to deliver one of said plurality of fourth addresses, said fourth addrss identifying the address of a segment in said segmented memory.

2. An apparatus as defined in claim 1 and further including:
   - no match means responsive to said comparing means when said second address is found not matched to one of said plurality of first addresses, said no match means providing a signal, and selection means for addressing said storing means, said selection means in response to said comparing means identifying one of said pluraliy of first addresses in said storing means.

3. An apparatus as defined in claim 2 wherein said selection means includes:

replacement means for identifying one of said addresses in said plurality of first addresses, said replacement means responsive to said no match means, and logic means for addressing said plurality of first addresses, said logic means responsive to either said replacement means when said second address is not matched or to said comparing means when said second address is matched to one of said plurality of first addresses.

4. An apparatus as defined in claim 3 and further including:

means for changing said replacement means when said signal from said no match means is received, said replacement means comprising means to identify to said logic means said replaceable address is said plurality of first addresses, and wherein said logic means identifies said replaceable address in said plurality of first addresses when said comparing means does not indicate a match between said second address and one of said plurality of first addresses.

5. An apparatus as defined in claim 4 wherein said changing means in response to a selected first address reenables said replacement means such that said logic means does not address said selected first address for replacement.

6. An apparatus for developing a relative address for a memory having variable sized segments, said apparatus comprising:

means for receiving a first address which directs access to a segment located in said segmented memory, first means for appending a first identifier to an address, said first identifier indicating a valid address, means for storing a plurality of second addresses, each of which may include said first identifier of a valid address, means for comparing said first address and said first identifier of a valid address with said plurality of second addresses, match means responsive to said comparing means for generating a first signal when said first address and said first identifier of a valid address are contained in said plurality of second addresses, and means for identifying the starting address of said segment directed to by said first address, said identifying means including a plurality of third addresses each of which corresponds to one of said plurality of second addresses, said identifying means in response to said first signal selecting one of said plurality of third addresses.

7. An apparatus as defined in claim 6 wherein said selected first address includes a procedure bit identifying the active procedure being excecuted.

8. An apparatus as defined in claim 6 and further including:

selection means for addressing said plurality of second addresses, said selection means responsvie to said first signal, and no match means responsive to said comparing means for generating a second signal when said first address and said first identifier of a valid address are not contained in said plurality of second address, said second signal also provided to said selection means.

9. An apparatus as defined in claim 8 and further including:

second means for appending a second identifier to an address, said second identifier indicating an active procedure being executed said storing means containing said second identifier of said active procedure among said plurality of second addresses, and means for sensing said second identifier of said active procedure from said storing means, said sensing means providing a third signal to said selection means when said second identifier of said active procedure is sensed, said selection means ensuring that said address of said second identifier of said active procedure in said plurality of second addresses is not destroyed.

10. An apparatus as defined in claim 9 wherein said selection means include:

replacement means responsive to said second signal and said third signal for identifying one of said plurality of second addresses, said second signal and said third signal changing said replacement means, and a plurality of logic means for addressing said plurality of second addresses, each of said logic means addressing one of said plurality of second addresses.

11. An apparatus as defined in claim 10 wherein said logic means includes:

said second means for appending said second identifier of said active procedure to one of said plurality of second addresses, said second means responsive to said first signal and to a write active procedure microcommand, means for reading one of said plurality of second addresses, said reading means responsive to said third signal, to said replacement means and to a read microcommand, means for writing said first address into said storing means, said writing means responsive to said third signal, to said replacement means and to a write microcommand, first means for purging said first identifier of a valid address, and second means for purging said second identifier of said active procedure.

12. An apparatus as defined in claim 11 wherein said identifying means includes:

encoder means for providing a fourth signal, said encoder means responsive to said first signal, and memory means for storing said plurality of third addresses, said memory means responsive to said fourth signal such that one of said plurality of third addresses is provided, said one of said plurality of third addresses identifying said starting address of said segment directed to by said first address.

* * * * *